Feb. 13, 1934.  E. L. BARRETT  1,946,563
DIRECT CURRENT TRANSFORMING DEVICE
Filed June 6, 1932  2 Sheets-Sheet 1
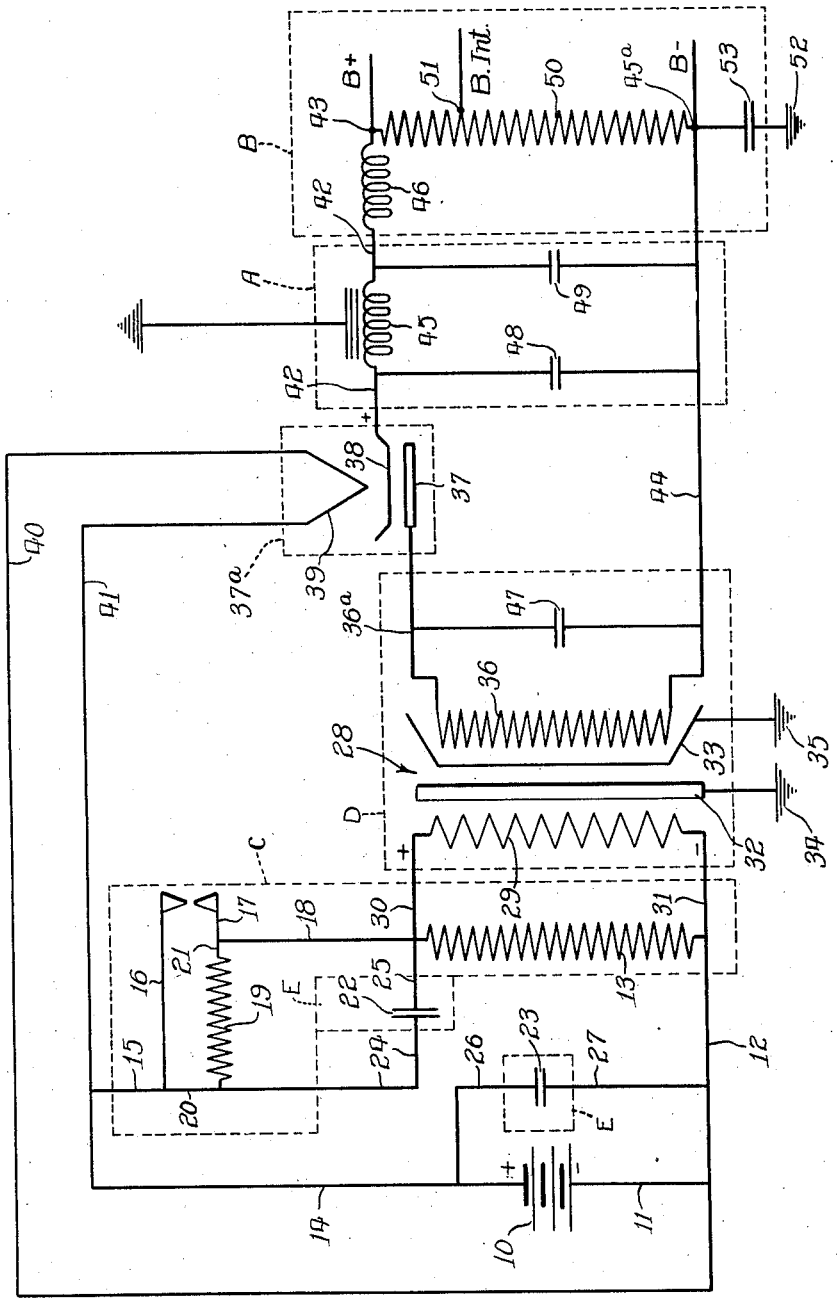
Inventor:
Edward L. Barrett
By Chindahl, Parker, Railton
Attys.

Feb. 13, 1934.  E. L. BARRETT  1,946,563
DIRECT CURRENT TRANSFORMING DEVICE
Filed June 6, 1932   2 Sheets-Sheet 2
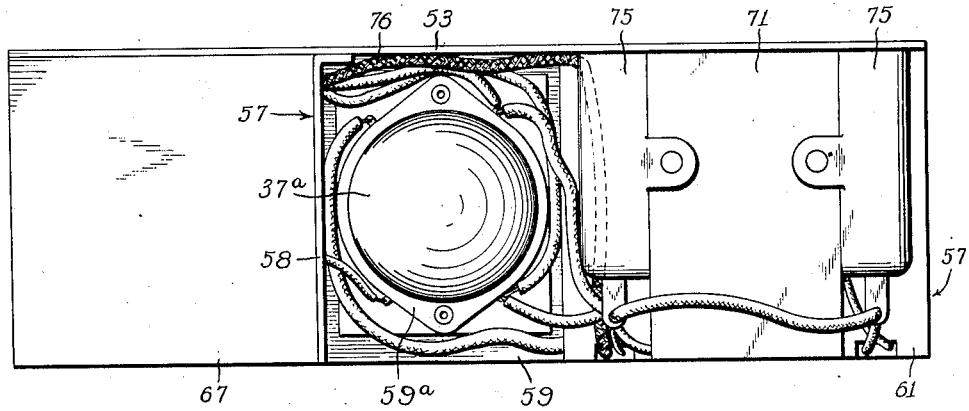
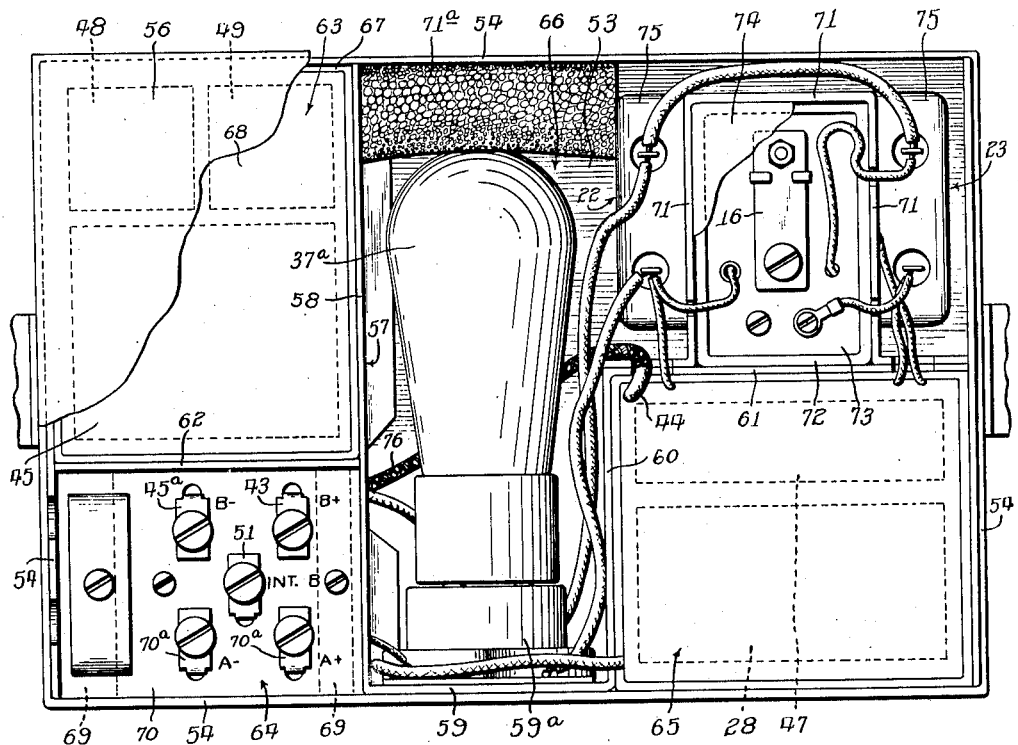
Inventor:
Edward L. Barrett
By Churdahl Parker & Carlson
Attys.

Patented Feb. 13, 1934

1,946,563

UNITED STATES PATENT OFFICE 1,946,563

DIRECT CURRENT TRANSFORMING DEVICE

Edward L. Barrett, Chicago, Ill., assignor to Utah Radio Products Co., Chicago, Ill., a corporation of Illinois Application June 6, 1932. Serial No. 615,553

7 Claims. (Cl. 171—97)

The invention relates to direct current transforming devices and more particularly to devices for increasing the potential of a direct current from a source of relatively low potential.

An object of the invention is to provide a new and improved device of this nature which, while being eminently suitable for many other uses, is especially adapted for use with radio receiving sets wherein the current is derived from a battery.

Another object is to provide a novel device for efficiently transforming direct current from a source of current of relatively low potential into an alternating current of relatively high potential and thence into a direct current of relatively high potential.

In conjunction with the foregoing, a further object resides in the provision of a device which may be connected with the same source of current that feeds the ignition circuit of a motor and which embodies a novel arrangement of elements whereby to substantially eliminate or suppress all interference normally incident to the operation of the device or of said ignition circuit.

Another object is to provide a device which is a compact relatively small sized unit and in which the various elements are so arranged and shielded that interference or as it may be termed "static noise" induced, not only from external sources but introduced in the device by the operation of the separate elements, is eliminated.

Other objects and advantages will become apparent in the following description and from the accompanying drawings in which:

Figure 1 is a wiring diagram of the circuit in a device embodying the features of the invention.

Fig. 2 is a side elevation looking downwardly on the device as shown in Fig. 3 with the enclosing case omitted.

Fig. 3 is a front elevation of the device with the cover partially broken away.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The exemplary form of the invention which has been illustrated is especially adapted to supply direct current of relatively high potential to what is generally termed the "B" circuit of a radio receiving set which is mounted in a motor vehicle, aeroplane, or the like. For convenience, the device will be hereinafter considered as being utilized in this connection.

Considering the arrangement and organization of elements as shown in the wiring diagram, 10 designates the customary storage battery from which current is derived for the ignition circuit (not shown) of the vehicle motor. The battery 10 is connected by leads 11 and 12 with one side of the winding 13 of a suitable circuit interrupting device, herein shown as being of the buzzer type. The other side of the battery is connected by leads 14, 15 with one contact 16 of the interrupter device. The other contact 17 is connected by lead 18 with the other side of the winding 13. As is customary, one of the contacts 16 or 17 (herein the contact 16) is movable upon attraction thereof by energization of the winding 13 to break the circuit through the contacts and allow the movable contact to return to the normal position thereof in which the circuit is closed.

Preferably a relatively high resistor 19 is connected in shunt by leads 20, 21 across the leads 15, 18 to the contacts 16, 17 to prevent the circuit through the contacts from being completely opened at any time. The purpose of this arrangement will be presently set forth. Furthermore, condensers 22, 23 of relatively small capacity are preferably connected across the contacts 16, 17 and across the input leads 12, 14 by leads 24, 25 and 26, 27 respectively, to suppress any interference resulting from the operation of the circuit interrupting device. A further purpose of the condenser 22 is to prevent or reduce to a minimum arcing across the contacts 16, 17 during the operation of the interrupting device.

By operation of the interrupting device, a direct current of relatively low potential flowing from the battery becomes an interrupted current of relatively low potential. An increase in potential is obtained by such means as a transformer 28 having a primary winding 29 connected, in this instance, in parallel with the winding 13 of the interrupting device by leads 30, 31. The transformer 28 preferably embodies a core 32 and a static shield 33 both of which are grounded as at 34, 35 respectively.

The current from the secondary winding 36 of the transformer 28 is alternating and of relatively high potential. Means is provided for rectifying this current to obtain direct current of relatively high potential. In the present embodiment, the rectifying means comprises a mercury-vapor thermionic valve 37ª having a plate element 37, an ion emitting or cathode element 38, and a heating filament 39. The circuit by which the filament 39 is heated is electrically independent of the secondary circuit in the device so that the filament is heated directly from the battery. Thus, leads 40, 41 connect the filament with leads 14 and 11, respectively, from the battery. One side of the secondary winding 36 is connected by a lead 36ª with the plate element 37 to produce, in operation, a current flow from the secondary winding through the plate element to the cathode element 38. The cathode element has a lead 42 connecting said element with one output terminal 43 and a second lead 44 from the other side of the secondary winding 36 is connected with the other output terminal 45ª.

To smooth the wave form of the current flowing from the secondary winding, inductances 45, 46 are interposed in series in the lead 42 and condensers 47, 48 and 49 are respectively connected across the leads 44, 36ª between the secondary winding 36 and plate element 37, across leads 44, 42, between the cathode element 38 and first inductance 45, and across leads 44 and 42 between the two inductances 45 and 46. It has been found that better suppression of interference is obtained if one inductance, in this instance inductance 45, is a choke coil having a grounded iron core and the other inductance 46 is an air core choke coil. The location of capacitance 47 across the secondary winding and between said winding and the rectifier is important from the standpoint of suppression of sparking across the contacts 16, 17 since this function is not performed by the condensers 48, 49 of the filter system proper.

A fixed resistance 50 may be connected across the output terminals and have an intermediate tap 51 constituting an auxiliary output terminal for supplying direct current of less potential than maximum. If desired, the negative terminal for the "B" circuit, in this instance output terminal 45ª, may be grounded as at 52 through a condenser 53 so that the device may be adapted for use in receiving sets wherein the "B" circuit is not grounded.

The operation of the device is as follows: Current flowing from the battery 10 to the primary winding 29 of the transformer, the direction of flow being indicated by the positive and negative signs on the drawings, is interrupted by the interrupting device. Such interruption produces an alternating current of relatively high potential in the secondary winding 36. Since the circuit through the contacts 16 and 17 is never completely broken, because of the shunted resistance 19, the peaks of the wave form produced in the secondary are depressed or flattened. Moreover, the interference caused by the operation of the interrupting device is lessened by the action of said shunt circuit. The alternating current from the secondary winding is rectified by the valve and is transformed into direct current of relatively high potential, the wave form of which is smoothed out by the condensers and inductances.

Because the valve filament is heated from a circuit which is independent of the secondary there is no possibility that a short circuit may be created through the valve when the device is connected in the circuit of a receiving set. Moreover the filament cannot be subjected to such excessively high potentials as would destroy the filament. The device also includes various elements by which interference is eliminated or minimized, and in particular such interference as might otherwise pass to or from the battery.

A feature of the invention which is of considerable importance resides in the compact arrangement of the various elements in a particular manner whereby completely to suppress all interference created in the individual and associated operation of said elements. A preferred arrangement is shown in Figs. 2 and 3 with reference to Fig. 1 for illustration of the grouping of the elements. The entire device is mounted in an enclosing casing 54 preferably in the form of a rectangular box having a suitable cover 55, both formed of metal.

The case is interiorly divided into a number of small compartments by removable metallic means which serves to support the various elements and also shield the various elements from interference. To this end, an auxiliary base 56 (Fig. 3), dimensioned to fit snugly within the case against the bottom thereof, has secured to one face thereof a partition member 57. The member 57 (see Fig. 2) has a wall portion 58 extending transversely completely across the base 56 at one side of the center, a second right angled wall portion 59 extending longitudinally along one side edge across center, a third wall portion 60 extending inwardly transversely to about the longitudinal center of the base, and a fourth wall portion 61 extending along the last-mentioned center of the base 56 to the end thereof. Obviously, these four wall portions may be formed as separate partitions if desired. Between the first wall portion 58 and the adjacent end of the base is a longitudinal wall 62 which, together with the wall portion 58 and the walls of the case, divides that end of the case into large and small compartments 63, 64 respectively. The wall portions 60, 61 with the case walls form a compartment 65 which is spaced from the opposite two compartments 63, 64 by a central compartment 66.

As seen in Fig. 2, the larger of the compartments 63, 64 is located in the upper left-hand corner of the case and in this compartment the iron core choke coil 45 and the condensers 48, 49 are mounted. In Fig. 1 these elements are enclosed by the broken outline designated A. For convenience in assembly, these elements are enclosed in a cardboard container 67, the face of which is closed by a layer of pitch 68 or the like. The smaller compartment 64 has spaced short walls 69, which are respectively coextensive with the end edge of the base and with the part of the wall portion 58 defining that compartment, to support a terminal panel 70 on which the input terminals 70ª and output terminals 43, 45ª and 51 are mounted. This compartment also encloses the fixed resistance 50, the air core choke coil 46 and the condenser 53 which elements are mounted beneath the panel 70. These elements are enclosed by the broken outline designated B in Fig. 1.

The rectifier valve is received in the usual socket 59ª which is supported by the wall portion 59 and thus occupies the central compartment 66. Since the device is, in use, apt to be subjected to unusual vibration, it is preferred that a pad 71ª of resilient material, such as sponge rubber, be inserted between the free end of the valve and the adjacent wall of the case. This pad, while substantially absorbing or dampening vibrations, also exerts a resilient force for holding the valve seated in its socket.

The compartment 65 has the transformer assembly 28, and the condenser 47 grouped therein, as indicated by the broken outline C (Fig. 1), these elements being conveniently assembled in a cardboard container and pitch covering similar to that previously described.

In the remaining or upper right-hand corner of the case, the circuit interrupting device, condensers 22 and 23, and resister 19 are mounted. The grouping is generally indicated by dotted outline D in Fig. 1. Thus, a small tubular compartment is defined by a U-shaped housing 71 which is secured to the base 56 and to the wall portion 61. Within this housing, the winding 13 of the interrupting device is mounted, said winding being preferably separated from the enclosng walls by a layer of rubber or like material. The front edge of said layer is designated 72 in Fig. 2. A metallic plate 73 traverses the housing 71 in front of the winding on which plate the movable contact 16 is mounted. The remaining space at the front of the housing 71 is closed by a pad 74 of sponge rubber or similar vibration dampening material. The opposite longitudinal sides of the housing 71 support the two condensers 22, 23, said condensers being preferably disposed within metallic casings 75. It will be noted that the winding 13, resistor 19, and contacts 16, 17 are separated from the two condensers 22, 23 by metallic shielding walls. This shielding is shown in dotted outlines E in Fig. 1.

This arrangement of parts, it will be seen, disposes all of those elements, which tend in operation to create interference, at the greatest possible distance from the other elements most apt to be affected thereby. For example, the circuit interrupting device and parts associated therewith are at the maximum possible distance from the input and output terminals on the panel 70. Moreover, when the cover is in place every one of the compartments is entirely enclosed by metallic walls to shield the elements therein from interference.

A further advantage, inherent in the arrangement, is that all of the various connecting leads extend through the shortest possible distance in connecting the respective elements whereby to eliminate transmission or reception of interference by the leads. Preferably, the lead 44 between the secondary winding and the output terminal 45 is shielded with a metallic conduit 76 since this lead extends through the central compartment 66 and has no connection therein. Apart from this lead, the other leads extend directly from one compartment to a connection in an adjoining one.

From the foregoing, it will be evident that a novel device of this character has been produced which efficiently transforms a direct current of relatively low potential into a direct current of relatively high potential. Moreover, the device includes a novel arrangement of elements for reducing interference to a minimum electrically as well as an advantageous disposition of said elements for further reducing interference. As a result, the device produces practically no "noise" detrimental to reception.

I claim as my invention:

1. A device of the character described comprising, in combination, a source of direct current of relatively low potential, a transformer having a primary winding connected with said source and a secondary winding, a circuit interrupting device interposed in said connection including make and break contacts and an energizable winding for actuating said contacts, a rectifier valve for transforming alternating current of relatively high potential from the secondary winding into direct current of relatively high potential, said valve having a plate element connected with one side of the secondary winding, a cathode element connected to the output side of the device, and a heater filament connected directly with the low potential source of direct current and independently of the high potential current, and a lead from the other side of the secondary winding to the output side of the device.

2. A device of the character described having, in combination, a source of direct current of relatively low potential, a transformer having primary and secondary windings, connections between said source and said primary winding including an interposed circuit interrupting device, a rectifier valve connected with said secondary winding and including a heater element connected directly with said source and independently of said secondary winding, and output leads from said valve and said secondary winding.

3. In a device for transforming direct current of relatively low potential to direct current of relatively high potential for connection as a unit with the "B" circuit of a radio receiving set for motor vehicle installation, the combination of means connected with the storage battery of the motor vehicle for producing an alternating current of relatively high potential from the direct battery current of relatively low potential, and rectifier means for transforming the alternating current of relatively high potential into direct current of relatively high potential including a heating means energized through an independent circuit by the direct battery current of relatively low potential.

4. A device of the character described having, in combination, a source of direct current of relatively low potential, a transformer having primary and secondary windings, connections between said source and said primary winding including an interposed circuit interrupting device, a mercury-vapor thermionic rectifier valve connected with said secondary winding including a heater element connected directly with said source and independently of said secondary winding, and output leads from said valve and said secondary winding.

5. A "B" battery eliminator for motor vehicle installations of radio receiving sets comprising, in combination, a storage battery in the vehicle, a transformer having primary and secondary windings, connections between said battery and said primary winding including an interposed circuit interrupting device, a rectifier valve operatively connected with said secondary winding and including a heater element connected directly with said battery and independently of said secondary winding, and output leads from said valve and secondary winding for connection with the "B" circuit of the radio receiving set.

6. A converter for motor vehicle installations of radio receiving sets comprising, in combination with the storage battery of the vehicle as a source of low potential direct current; a circuit interrupting device; a transformer having primary and step-up secondary windings; a rectifier valve including a heating filament and plate and cathode elements; electrical connections including the battery, circuit interrupting device, primary winding and valve filament; and other electrical connections including the secondary winding, plate and cathode elements and having output leads; said two electrical connections having no direct electrical communication.

7. In a converter of the character described having a rectifier valve, the combination of an input circuit for connection with a storage battery as a source of low potential direct current, said input circuit including a circuit interrupting device, a transformer primary winding, and heating means for a rectifier valve, and an output circuit for connection with a receiving set circuit, said output circuit including a transformer secondary winding, and cooperating elements of the rectifier valve, there being no direct electrical connection between said input and output circuits.

EDWARD L. BARRETT.